US006423552B1

United States Patent
Lu et al.

(10) Patent No.: US 6,423,552 B1
(45) Date of Patent: Jul. 23, 2002

(54) METHOD FOR THE PREPARATION OF COMPOUND MICRO ARRAY CHIPS AND THE COMPOUND MICRO ARRAY CHIPS PRODUCED ACCORDING TO SAID METHOD

(75) Inventors: Zuhong Lu; Liapang Zhang; Jianmin Ma; Chunxiang Xu; Yali Chen, all of Nanjing (CN)

(73) Assignee: Zuhong Lu, Nanjing (CN)

( * ) Notice: Subject to any disclaimer, the term of this patent is extended or adjusted under 35 U.S.C. 154(b) by 0 days.

(21) Appl. No.: 09/647,525

(22) PCT Filed: Jan. 29, 1999

(86) PCT No.: PCT/CN99/00013

§ 371 (c)(1),
(2), (4) Date: Jan. 9, 2001

(87) PCT Pub. No.: WO99/51770

PCT Pub. Date: Oct. 14, 1999

(30) Foreign Application Priority Data

Apr. 3, 1998 (CN) .......................... 98111220 A

(51) Int. Cl.⁷ .................. H01L 21/00; H01L 21/31; H01L 21/469
(52) U.S. Cl. ............... 438/1; 438/780; 438/781
(58) Field of Search ................ 438/1, 780, 781, 438/99

(56) References Cited

U.S. PATENT DOCUMENTS 5,252,294 A * 10/1993 Kroy et al. ............... 422/102

FOREIGN PATENT DOCUMENTS

| DE | 38 18614 A1 | 1/1988 |
| WO | WO 97/43447 | 11/1997 |
| WO | 97/43447 | * 11/1997 |

* cited by examiner

Primary Examiner—Alexander G. Ghyka
(74) Attorney, Agent, or Firm—Harness, Dickey & Pierce, P.L.C.

(57) ABSTRACT

The present invention relates to a method for the preparation of compound of microarray chips, especially the method by repeatedly impressing reagents at fixed locations on a substrate to synthesize said chips; and also realtes to a compound microarray chips produced according to said method.

14 Claims, 3 Drawing Sheets

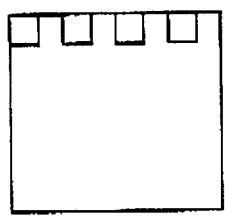 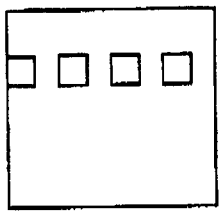 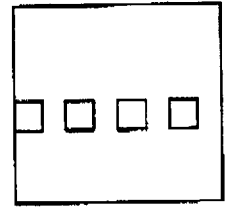 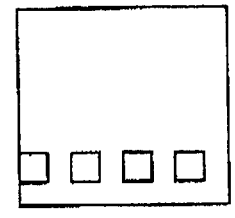
Fig.4  Fig.5  Fig.6  Fig.7
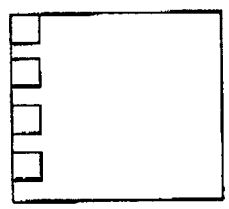 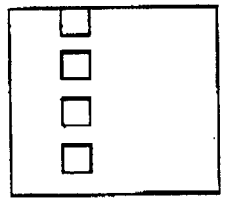 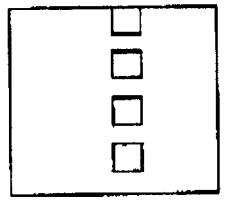 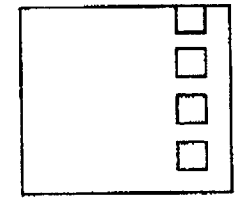
Fig.8  Fig.9  Fig.10  Fig.11
Fig.12

METHOD FOR THE PREPARATION OF COMPOUND MICRO ARRAY CHIPS AND THE COMPOUND MICRO ARRAY CHIPS PRODUCED ACCORDING TO SAID METHOD

FIELD OF THE INVENTION

The prespent invention relates to a new method of preparation of chemical or compound microarray chip, particularly a method of preparation in situ of chemical or compound microarray with multi-stamping, and a chemical or compound microarray chip produced by said method.

The invention provides a microarray chip of chemical molecules immobilized on a solid support and a novel method of preparing for these microarray chips by microstamps. The array comprises of a set of different chemical molecules which are mainly some biomacromolecules including nucleic acids such as DNA, RNA and oligonucleotide; polypeptides or protein such as enzyme, antibody and antigen; and other synthetic compounds with biological activities such as peptide nucleic acids (PNA) and so on. Those microarray chips can be called as gene chips while those immobilized molecules have properties of nucleic acid molecules.

BACKGROUND OF THE INVENTION

It is extremely significant that chemical microarray chips are applied in biological detection, medical detection, pharmaceutical screen, gene sequence analysis and synthesis of chemical compound library With the development of molecular biology and the coming actualization of human genome project (HGP), the knowledge on structure and sequence of those biomacromolecules including nucleic acid and protein is mushrooming. In the time of post HGP, the most challenging work is how to analyze a large amount of biological information and find out the rules so as to understand the life better and make an essential revolution of medical therapy Modern medicine is converting the second stage at the level of system, apparatus, tissue and cell to the third stage at the level of the molecular interactions during the process of DNA RNA protein, the interactions between protein and nucleic acid, and the interactions between these biomacromolecules and the environment. Gene diagnosis and gene therapy at the level of molecular interactions will probably open out the roots of many diseases including the cancer. All these transformations in biology and medicine depend on rapid determination and analysis of a mass of gene sequences, which will influence the actualization of HGP and further development of biology and medicine. Those traditional methods of gene sequencing with many heavy and complicated procedures including chemical reaction, gel electrophoresis and so on, have some drawbacks such as time-consuming, difficult to operate and schlep. Biochip technology centred on genechips, is emerging as the times require during the improvement of those traditional methods of gene sequencing. Biochip technology integrates many discontiguous analytic units in the study of life science such as sample preparation, chemical reaction and detection, into one chip by methods of microelectonics and micromechanics, and achieves the consecution, integration and micromation of analytical technologies.

Sequence analysis of protein or nucleic acid is based on the specific interactions between those chemical molecules immobilized on solid-phase supports and those molecules as sample. For instance, in sequence analysis of nucleic acid, oligonucleotides as probes are immobilized on solid supports and one microarray of chemical molecules is formed. Then, these immobilized oligonucleotide probes are hybridized with the gene or oligonucleotides as sample in solution. Finally, the information of sample gene sequence can be obtained by analyzing the hybridization result based on computer programs. During the whole process, the preparation of oligonucleotide probe arrays is pivotal.

An ideal probe array needs high spatial resolution, small workload, high speed, simple operation and low cost. Currently two methods of preparing for oligonucleotide probe arrays have been described. One method is to synthesize those different single probes, respectively, based on solid-phase synthesis technology, then bind those probes at different locations on the substrate by ink-jet or printing. This method has some shortcomings including unreachable high spatial resolution, large synthetic workload, low integrity, time-consuming, high cost and disadvantages in mass production. The other method is the light-directed synthesis in situ by masks, which is devised by the researchers of Affymetrix Company in United States. The spatial resolution of those microarrays prepared by this method can reach up to $40 \times 40 \ \mu m^2$ and the synthesis can be speeded greatly for parallel working. However, low efficiency of photochemical reaction due to serious side reactions has led to low correctness of the sequences of synthetic probes. Also, high cost is still needed for those expensive reagents for specific protecting groups. Therefore, it is very necessary for preparation of chemical microarray chips to develop a new method.

OBJECT OF THE INVENTION

The object of the present invention is to provide a new method of in-situ synthesis for chemical or compound microarray chips with high density including DNA microarray and PNA microarray by multi-stamping.

SUMMARY OF THE INVENTION

The inventors have made a intensive study for chemical microarray chips and have unexpectively discovered a new method of preparation of chemical microarray chips. The method of the present invention has many advantages such as simple and reliable operation, low cost, high spatial resolution and high correctness. This method includes the following steps: first, design and prepare for microstamps with concavo-convex pattern according to the needed chemical microarray, then cover the corresponding reagents on the so of microstamps and stamp onto the same substrate one by one. Those chemical reactions can be carried out in the specific region of the substrate surface controlled by the concavo-convex pattern of microstamps. Then the preparation of chemical microarray chips is completed. Different chemical microarray chips can be prepared by using different chemical reagents.

BRIEF DESCRIPTION OF THE DRAWINGS

FIG. 4: Stamp 1, which is used to prepare for the complete array with two nucleotides.

FIG. 5: Stamp 2, which is used to prepare for the complete array with two nucleotides.

FIG. 6: Stamp 3, which is used to prepare for the complete array with two nucleotides.

FIG. 7: Stamp 4, which is used to prepare for the complete array with two nucleotides.

FIG. 8: Stamp 5, which is used to prepare for the complete array with two nucleotides.

FIG. 9: Stamp 6, which is used to prepare for the complete array with two nucleotides.

FIG. 10: Stamp 7, which is used to prepare for the complete array with two nucleotides.

FIG. 11: Stamp 8, which is used to prepare for the complete array with two nucleotides.

FIG. 12: Sketch drawing of the complete array with two nucleotides on the substrate.

FIG. 13: Photolith gel 3 is covered at the dimension of micrometer on the smooth surface of the substrate such as glass and silicon.

FIG. 14: Transfer the designed concavo-convex pattern onto photolith gel 3.

FIG. 15: The silastic PDMS as material were poured onto the template with photolith gel, and then polymerize, solidify and form microstamp 1.

FIG. 16: Microstamp 1 separated from the template with photolith gel.

FIG. 17: The surface of microstamp covered by a layer of chemical reactant 4.

FIG. 18: Microstamp covered by a layer of chemical reactant 4 is stamping on the substrate 6 modified by chemical group 5.

FIG. 19: Chemical microarray lined with reaction products on the substrate after stamping, reacting and separating from microstamp 3.

DETAILED DESCRIPTION

Figures 1, 2, 3:
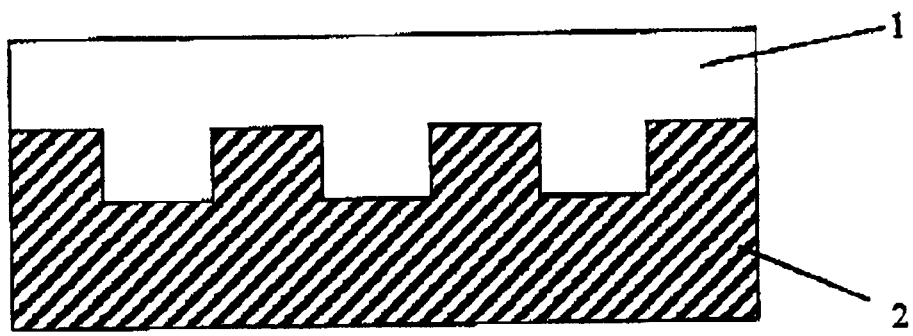
FIG. 1: Sketch drawing of microstamps prepared by one template in the present invention.
FIG. 2: Sketch drawing of chemical microarray prepared by multi-stamping, the surface of four microstamps (A, B, C and D) is covered by four kind of chemical reagents (A, B, C and D), respectively.
FIG. 3: Sketch drawing of chemical microarray prepared by overstamping, the surface of four microstamps (A, B, C and D) is covered by four kind of chemical reagents (A, B, C and D), respectively.
Figure 13:
FIG. 13~FIG. 19 reflects the flow chart of template preparation, microstamp preparation and chemical microarray preparation.
Figure 16:
Figure 14:
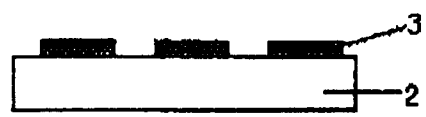
Figure 17:
Figure 18:
Figure 15:
Figure 19:
Figure 20:
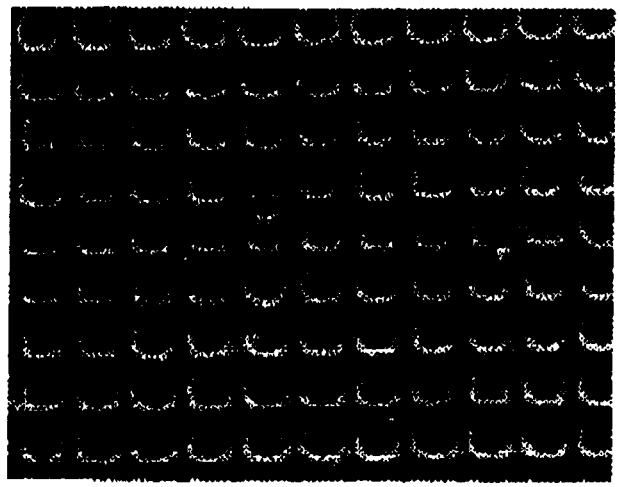
FIG. 20: The local photo of PDMS microstamp with 256×256 microarray on the area of 1.28×1.28 $cm^2$ under electron microscope.

The one aspect of this invention relates to a novel method for the preparation of chemical microarray chips, particularly a method of preparation for them by multi-stamping synthesis.

The another aspect of this invention relates to those chemical microarray chips prepared by the above-mentioned method, especially including DNA microarray and PNA microarray with high density.

According to the present invention, the method of the invention characterizes in that: (a) designing and preparation of microstamps according to the request of chemical microarray chips, (b) adding the solutions of corresponding reactants to the microstamps prepared in (a), (c) according to the designed order, those microstamps on which covered the corresponding reagents arc stamped one by one on the same one substrate by a set of positioning, then form the desired chemical microarray chip with different chemical units on the substrate.

According to the present invention, the method of the invention characterizes in that the microstamps in (a) are prepared as follow: obtain the template with concavo-convex pattern on the substrate using corrosion or photolithograph, introduce liquid polymer material into the template, then polymerize, solidify and take the solidified polymer down from the template. Alternatively, the template with microstamps can be directly prepared by photolithograph, corrosion, laser bean, particle beam or micro-knife and so on.

According to the present invention, those polymer materials used to prepare for microstamps can be either solid polymer materials such as rubber, or some porous polymer materials with many micro-holes.

According to the present invention, in the step (b) of the present invention, some catalysts including enzymes also can be introduced onto the micro-stamps prepared in (a) system for accelerating the linking reaction.

According to the present invention, in the step (c), the positions of multi-stamping for chemical reaction on the same substrate can be overlapped or non-overlapped.

In the step (c), by introducing sound, electricity, heat, light and/or magnetism on the substrate or microstamps, chemical reactions can be accelerated.

In the present method, the steps (b)~(c) are carried out under vacuum or free-trouble gas such as nitrogen, argon.

More particularly, the microstamps of the present invention are prepared by the method of corrosion or photolithograph, which comprises processing on the substrate using corrosion or photolithograph to form a template, introducing liquid polymer material onto the template, then polymerizing, solidifying and talking the polymer down from the template. So the previous concavo-convex pattern on the template was copied on the surface of the solidified polymer.

According to the present invention, an another method of preparing for microstamps comprises processing on the substrate such as silica according to the design and forming the template with concavo-convex pattern by photolithograph or corrosion, then stamping the template on the softening surface of the polymer under heat, after cooling and taking the polymer down, the preparation of microstamps is completed.

According to the present invention the third method of preparing for microstamps comprises proceeding directly on the surface of polymer stamp material using laser beam, particle beam or micro-knife under the control of the computer according to the designed concavo-convex pattern.

According to the present invention, the polymer materials used to prepare for microstamps can be either solid polymer materials such as rubber, or some porous polymer materials with many micro-holes.

According to the present invention, in the preparation of microstamps, the polymer microstamps can be fixed in a frame made of metal material, so that the positions of concavo-convex is fixed on the surface of microstamps. By using a mechanic device to fix and measure the positions of microstamps and the stamped substrate, control the stamping position of microstamps and make the bulges of microstamps stamp on the surface of the substrate precisely according to the design request.

According to the present invention, the positions of multi-stamping for chemical reaction on the same substrate can be overlapped, so that multi-step chemical reactions can be carried out in order at the same position, those crossed reactions can be avoided. In addition, those positions can also be non-overlapped, in which chemical reactions can be carried out at fixed positions. After stamping, the cleaning and the chemical treatment of the substrate are needed in order to meet the request of post-stamping for chemical reactions at fixed positions.

In the present invention, some physical energy including sound field, light, heat, electricity, magnetism, surface wave and SPR can be introduced into the process of stamping chemical reactions at fixed positions by the substrate or microstamps, so that those reactions can be accelerated. Alternatively, the acceleration can also be reached by adding the catalysts or enzymes into the solutions of chemical reactants. The whole process including stamping chemical reactions at fixed positions and the preparation of microarray chips should be kept under vacuum or free-trouble gas such as nitrogen and argon.

The substrate used for chemical microarray chips can be those inorganic or solid organic materials such as silicon, glass, china, metal and polymer, and the molecular films modified or assembled on the surface of these materials, which can be compact or porous.

This invention also refers to chemical microarray chips prepared by the method of the present invention. The spatial resolution of these chips is very high and can be reached up to $30 \times 30 \, \mu m^2$. And the integrity of these chips is high up to $6.5536 \times 10^4$ dots per $cm^2$. This method also provides high correctness. The single-step correctness is high up to 99.5%, and the total correctness of twenty steps can reach up to over 90%. These indexes can be improved greatly with the precision of microstamps and the mechanic device of stamping improved.

The following examples are a further description for the present invention, but do not mean any limits to this invention.

EXAMPLE 1.

Preparation of DNA Microarray Chips with High Density

A. Preparation of Microstamps

Cover a layer of photolithographic pastern on clean silica by mechanic device, which is thin as about $10 \, \mu m$, and place it under photolith mask. After exposing, a template with concavo-convex surface is formed. Place a small box without underside on the template, the position of the edges of the box and the template can be calibrated, the error should be less than $1 \, \mu m$, The template can be regarded as the underside of the small box, There is a small sprue on the upside of the box. From the sprue, PDMS, a silicone rubber material, can be injected into the box. Then the small box is full of PDMS. After PDMS solidifying, take down the small box and the solidified PDMS (silica rubber) carefully from the template. So the solidified PDMS copied the concavo-convex pattern on the template and the preparation of microstamps is completed.

B. Preparation of the Arrays of Oligonucleotide Probes.

Clean the slide, dry and place it into the solution of APTES (aminopropyltriethoxysilane)in benzene for two hours. After rinsed in benzene, the slide was placed into the solution of succinic acid in benezene for one hour. So the hydroxy groups were linked on slide surface. The whole process of preparing for genechips is carried out under the protection of argon. Coat the solution of nucleotide (whose 5'—OH has been protected by DMT (di-p-methoxytrityl)) such as dAdp and solution of tetrazole (as catalyst) in dry acetonitrile on PDMS microstamps. Then the microstamps were stamped on the substrate by a set of mechanic device that can measure and correct the stamping positions. The 3'—OH of DATP was coupled covalently on the substrate at the presence of tetrazole. Introducing piezoelectric ultrasonic vibration source on the substrate, the reaction can be accelerated by ultrasonic. When different microstamps and different nucleotides were used to repeat the above-mentioned process on different locations, nucleotide arrays is formed. After that, use the solution of thiophenol or trichloroacetic acid in acetonitrile to remove DMT that is used to protect 5'-OH of nucleotides on the substrate, and exposure of 5'—OH. Collect the removed DMT solution and regulate to a constant volume using acetonitrile,. then determine the OD value of DMT solution at 495 mn using DMT-Cl solution as standard. According to the ratio of the OD value at this step to the former one, the synthetic yield for the first layer of nucleotides can be obtained. Repeating the stamping process as mentioned above, the second layer of nucleotides, the third layer, . . . all can be linked in order until the twentieth layer of nucleotides was synthesized. Then treat the substrate using 30% solution of ammonia so as to remove those groups for protecting basic groups and phospho groups. Rinse the chips using water, dry and encapsulation. Thus, the preparation of gene chip was completed. On this chip, the size of every gene probe as a unit is $30 \times 30 \, \mu M^2$, the number of different probes on the area of $1 \, cm^2$ is $6.5536 \times 10^4$. According to the OD values of DMT solutions as determined, the mean value of synthetic yields for every layer reached up to 99.5% and the correctness of probe sequence is above 90%. It took about seven hours to complete the total preparation of the chip with 20 layers of nucleotides while it needed about twenty minutes for every layer.

EXAMPLE 2.

Preparation of PNA Microarray Chips with High Density

Peptide nucleic acid (PNA) is a kind of polypeptide analog with the properties of nucleotides for four kind of bases are linked to its sidechain. It is an oligopolymer of N-(2-aminoethyl glycine) as a structural unit. PNA can be hybridized with DNA, RNA and PNA with the complementary sequence, and the thermostability and the sensitivity to detect mismatches of PNA are all very high. Even it can recognize single base mismatch under certain conditions. Therefore, the application of PNA microarray chips with high density can improve greatly the accuracy and the sensitivity of genechip hybridization, The preparation process of PNA microarray chips with high density is followed as:

A. Preparation of Microstamps

Preparation of microstamps is the same as A of example 1.

B. Preparation of Structural Units of Peptide Nucleic Acid Containing Thynine, Cytosine, Adenine and Guanine, Respectively.

They are N-2-Boc-amninoethyl-N-thymine-1-acetylglycine (Gly-T), N-2-Boc-ethyl-N-cytosine-1-acetylglycine (Glv-C), N-2-Boc-ethyl-N-adenine-1-acetylglycine (Gly-A) and N-2-Boc-ethyl-N-guanine-1-acetylglycine (Gly-G).

C. Preparation of PNA Probe Arrays on the Substrate

Clean the slide, dry and place it into the solution of APTES in benzene for 2 hours. Thus, amino groups were linked on the slide surface. Then cover the solutions of the above-mentioned PNA unit such as Gly-A and pentafluo phenyl ester on the PDMS stamps, and stamp on the substrate by a stamping mechanic device. Under the activation of pentafluo phenyl ester on chemical groups on the substrate, the C-terminal of Gly-A was bonded chemically with the substrate. Introducing piezoelectric ultrasonic vibration source on the substrate, the reaction can be accelerated by ultrasonic. When different microstamps and different PNA units containing the mixed solution of different bases like GIy-T, Gly-G, Gly-C and pentafluo phenyl ester were used to repeat the above-mentioned process on different locations, single-layer of PNA array is formed with single base. After that, determine the coupling yield by the method of ninhydrin. Repeating the stamping process as mentioned above, the second layer of PNA units, the third layer, . . . all can be linked in order until the twentieth layer of PNA units was synthesized. Then treat the substrate using 30% solution of NaOH so as to remove those groups for protecting basic groups and phospho groups. Rinse the chips using water, dry and encapsulation. Thus, the preparation of PNA chip was completed. On this chip, the size of every PNA probe as a unit is 30×30 $\mu m^2$, the number of different probes on the area of 1 $cm^2$ is $6.5536 \times 10^4$. According to the determined results using ninhydrin, the mean value of synthetic yields for every layer reached up to 99.9% and the correctness of probe sequence is above 98%. It took about 24 hours to complete the total preparation of the PNA chip with 20 layers of PNA units while it needed about 1 hour for every layer.

What is claimed is:

1. A method for preparing chemical microarrays by synthesizing biopolymers on a plurality of sites on a substrate by a designed series of stamping steps with chemical coupling following each stamping step, the method comprising the steps of:

a) designing a series of biological sequences to be synthesized at each of the sites on the substrate;

b) preparing a set of microstamps with a pattern determined according to the sequence design; and c) repeating the following steps until the desired biopolymers are synthesized:

coating a microstamp with a solution comprising biological molecules;

pressing the coating microstamp onto the substrate to deliver the biological molecule to at least some of the sites on the substrate; and covalently coupling the biological molecule to the surface;

wherein in the repeated steps, the biological molecules and the microstamps are used in a sequence that results in synthesizing the desired biological sequences on the substrate.

2. A method according to claim 1, wherein the repeated steps are carried out at least twice.

3. A method according to claim 1, wherein the biopolymers are synthesized by selecting, on subsequent repeated steps, the same or a different biological molecule, and changing the pattern of the microstamp.

4. A method according to claim 1, further comprising introducing a chemical catalyst or biological enzyme into the coupling step to increase the efficiency of the coupling reaction.

5. A method according to claim 1, further comprising introducing an energy source selected from the group consisting of sound energy, light energy, heat energy, and magnetic energy into the pressing or coupling steps to increase the efficiency of the reaction.

6. A method according to claim 1, wherein the coupling reaction is carried out in a vacuum.

7. A method according to claim 1, wherein the coupling reaction is carried out in an inert gas.

8. A method according to claim 1, wherein the biological molecules comprise nucleic acids.

9. A method according to claim 1, wherein the biological molecules comprise a peptide having a side chain, with nucleotide bases linked to the side chain.

10. A method according to claim 1, wherein the biopolymers comprise polynucleotides.

11. A method according to claim 1, wherein the biopolymers comprise polypeptide nucleic acids.

12. A method for preparing chemical microarray chips, comprising the steps of:

a) designing and preparing a set of microstamps according to the required chemical microarray, b) adding a composition comprising chemical reagents to the surface of the microstamps; and c) under the designed order, pressing the microstamps of b) onto a solid substrate one-by-one, wherein each pressing step is followed by a chemical coupling reaction, to form the microarray chips, wherein the composition of b) further comprises catalysts that increase the efficiency of the coupling reactions, wherein the catalysts are selected from the group consisting of chemical catalysts and biological enzymes.

13. A method for preparing chemical microarray chips, comprising the steps of:

a) designing and preparing a set of microstamps according to the required chemical microarray, b) adding a composition comprising chemical reagents to the surface of the microstamps; and c) under the designed order, pressing the microstamps of b) onto a solid substrate one-by-one, wherein each pressing step is followed by a chemical coupling reaction, to form the microarray chips, wherein the position of the chemical reactions on the substrate from one pressing to another may be overlapping, or may be different.

14. A method for preparing chemical microarray chips, comprising the steps of:

a) designing and preparing a set of microstamps according to the required chemical microarray, b) adding a composition comprising chemical reagents to the surface of the microstamps; and c) under the designed order, pressing the microstamps of b) onto a solid substrate one-by-one, wherein each pressing step is followed by a chemical coupling reaction, to form the microarray chips, wherein energy selected from the group consisting of sound energy, light energy, heat energy, and magnetic energy is introduced into the interface between the microstamp and substrate to increase the efficiency of the chemical reaction.

* * * * *